United States Patent
Peletz

(10) Patent No.: US 12,432,642 B2
(45) Date of Patent: Sep. 30, 2025

(54) DYNAMIC CORE SHARDING IN A CLOUD-BASED 5G NETWORK

(71) Applicant: DISH Wireless L.L.C., Englewood, CO (US)

(72) Inventor: Brian Peletz, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 317 days.

(21) Appl. No.: 18/312,169

(22) Filed: May 4, 2023

(65) Prior Publication Data
US 2024/0373319 A1    Nov. 7, 2024

(51) Int. Cl.
*H04W 40/22*    (2009.01)

(52) U.S. Cl.
CPC .................................. *H04W 40/22* (2013.01)

(58) Field of Classification Search
CPC .................................................... H04W 40/22
See application file for complete search history.

(56) References Cited

U.S. PATENT DOCUMENTS

| | | | | |
|---|---|---|---|---|
| 9,674,108 | B1 * | 6/2017 | Ryan | ........................ G06Q 50/12 |
| 2022/0386393 | A1 | 12/2022 | Tamvada et al. | |
| 2023/0336379 | A1 * | 10/2023 | Srinivasan | .............. H04L 43/20 |

FOREIGN PATENT DOCUMENTS

EP    4052124 A1    9/2022

OTHER PUBLICATIONS

PCT International Search Report for International Application No. PCT/US2024/027094 mailed Jul. 25, 2024 (3 pages).
Written Opinion of the International Searching Committee for International Application No. PCT/US2024/055340 mailed Mar. 3, 2025 (15 pages).

* cited by examiner

*Primary Examiner* — Duc C Ho
(74) *Attorney, Agent, or Firm* — KW Law, LLP

(57) ABSTRACT

Systems, methods, and devices perform core services on a 5G data and telephone network. A first edge data center of a first cloud network receives a communication from user equipment (UE). The communication is directed to another UE. A potential core shard from a plurality of potential core shards is selected to route the communication. The potential core shard includes a first instance at a first data center of a cloud network and a second instance at a second data center of the cloud network. The first instance is provisioned at the first data center, and the second instance is provisioned at the second data center. The communication is routed from an edge service to the first instance over a first communication channel, from the first instance to the second instance over the core communication channel, and from the second instance to the second UE over a third communication channel.

20 Claims, 5 Drawing Sheets

DYNAMIC CORE SHARDING IN A CLOUD-BASED 5G NETWORK

TECHNICAL FIELD

The following discussion generally relates to data and telephone networks, and in particular to dynamically sharing network functions in a cloud-based data and telephone network.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers, and other devices. 5G technologies are capable of supplying much greater bandwidths than were previously available, so it is likely that the widespread deployment of 5G networks could radically expand the number of services available to customers. This expansion will accompany an increased need for cybersecurity.

The growing bandwidth and capacity of data and telephone networks relies on increasing software and hardware resources to support such networks. Hardware radio units and antennas are typically fixed in permanent or semi-permanent locations. In order to expand the area served by radio units, more units can be deployed or existing units can be redeployed. Either way, hardware must be physically present in the desired location.

The same is true for cloud-based hardware data and telephone infrastructure. The number of and location of data centers can limit expansion or performance of a cloud-based network. Routing a call over a network having fixed installations in Oregon and Ohio, for example, limits the available path available to deliver the call. Increasing the number of stops to route a call tends to decrease call quality. For one, latency increases because each stop takes additional time, even if only a fraction of a second. The risk of communication error or failure also increases each time a call hops to another device along its path. The impact on an individual call or message may seem trivial, but the costs become apparent when aggregated over time on a network that routes millions of calls and messages daily.

SUMMARY

Systems, methods, and devices are disclosed for performing core services on a data and telephone network. An example of a method includes the step of receiving a communication from a first user equipment (UE) at a first edge data center of a first cloud network. The communication is directed to a second UE. A potential core shard is selected to route the communication from a plurality of potential core shards. The potential core shard includes a first instance at a first data center of a second cloud network and a second instance at a second data center of the second cloud network. A core communication channel connects the first data center to the second data center. The first instance is provisioned at the first data center, and the second instance is provisioned at the second data center, in response to selecting the potential core shard. The process routes the communication from an edge service to the first instance over a first communication channel, from the first instance to the second instance over the core communication channel, and from the second instance to the second UE over a third communication channel.

Various embodiments of the potential core shards include a third core shard of a third cloud network. The potential core shard can be selected in response to having a fastest transit time of the plurality of potential core shards. The potential core shard may be selected in response to having a shortest distance of the plurality of potential core shards. The method can include deprovisioning the first instance at the first data center and the second instance at the second data center in response to completing the communication. The first cloud network is hosted by a first cloud provider, and the second cloud network is hosted by a second cloud provider. The first data center and the second data center are hosted by a network operator outside of the first cloud network.

Various embodiments of automated processes for routing on a data and telephone network include receiving a request from a first user equipment (UE) at a first edge data center of a first cloud network to access a core service of the data and telephone network. A core shard is selected from a plurality of potential core shards to perform the core service. The core shard includes a first instance at a first core data center outside of the first cloud network. The first instance is provisioned at the first core data center in response to selecting the core shard. The request can be routed from the first UE to an edge service over a first communication channel and from the edge service to the first instance over a second communication channel.

Various embodiments perform the core service at the first instance and decommission the first instance in response to completing the core service. The core service includes authenticating the first UE, handing the first UE off to a new radio unit, or billing. The first cloud network is hosted by a first cloud provider and the first instance is hosted by a second cloud provider.

Various embodiments of a cloud-based data and telephone network can include a processor in communication with a non-transitory memory configured to store instructions that, when executed by the processor, cause the cloud-based data and telephone network to perform operations. The operations can include receiving a communication from a first user equipment (UE) at a first edge data center of a first cloud network. The communication is directed to a second UE. A potential core shard is selected to route the communication from a plurality of potential core shards. The potential core shard can include a first instance at a first data center of a second cloud network and a second instance at a second data center of the second cloud network. A core communication channel connects the first data center to the second data center. The system can provision the first instance at the first data center and the second instance at the second data center in response to selecting the potential core shard. The communication is routed from an edge service to the first instance over a first communication channel, from the first instance to the second instance over the core communication channel, and from the second instance to the second UE over a third communication channel.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

Figure 1:
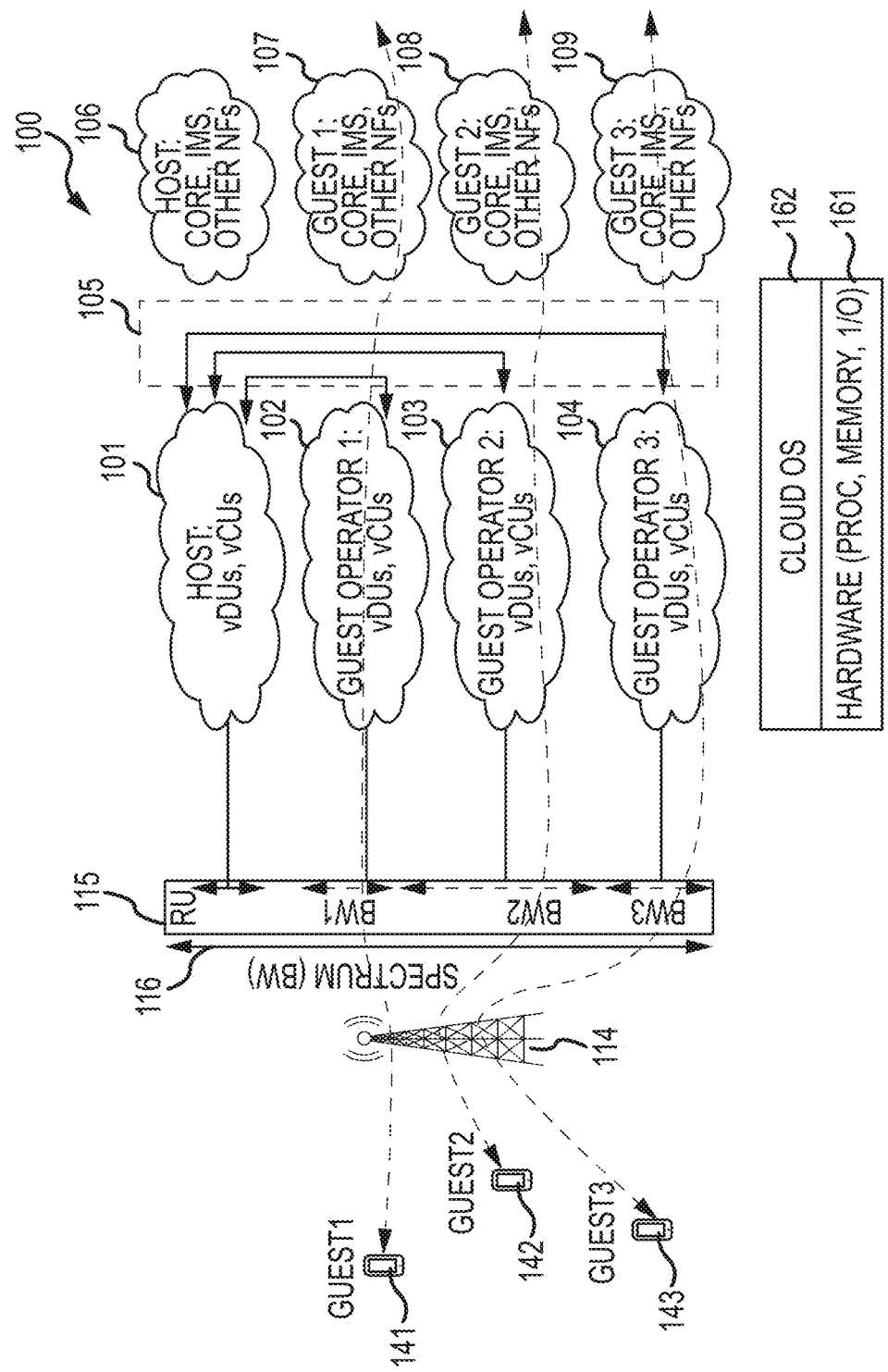
FIG. 1 illustrates an example of a 5G data and telephone network that uses virtualized network functions, in accordance with various embodiments.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

The present disclosure relates to the backbone or core network supporting a 5G data and telephone network. The network core services include access controls, user authentication for services, call routing, billing for calls and data use, and connections from the network out to the Internet or other area networks. Core services can also include managing handoffs as user equipment moves between radio towers. Users communicate through a radio with an edge facility that can then be routed through the network core to cross large distances. The core of a data and telephone network has high capacity but is typically fixed at the location of core data centers.

For example, consider a data and telephone network that might have core locations in Oregon, Ohio, and Virginia. To route a call from San Diego, CA to Atlanta, GA using the traditional core infrastructures, the call might have to route up to the core center in Oregon, then across the country to Ohio, then to Virginia before traversing back to Georgia. The relatively indirect route is dictated by the fixed locations of the network core in only three sites across the country. These fixed core locations leave little flexibility as to routing, since communications and other core services typically pass through these fixed core locations.

Systems of the present disclosure provision core shards in data centers outside of the fixed network core. Ephemeral core shards are created in data centers across the service region to temporarily provide core services across shorter routes. Shorter routes typically result in fewer network hops and faster transit times. Core shards can be deprovisioned when not in use to conserve resources.

Continuing the above example, the limited number of data centers suitable for hosting core services are fixed in Oregon, Ohio, and Virginia. The data and telephone network can spin up core shards in Arizona and Mississippi to create a more direct route from San Diego, CA to Atlanta, GA. The shorter route consumes less bandwidth because the communication travels less distance and through fewer hops from source to destination. The shorter route also tends to result in faster communications.

Various embodiments can locate core shards in networks hosted by third parties in networks separate from the core services of the data and telephone network. For example, a data and telephone network running in the AWS cloud hosted by Amazon® can create core shards on the Azure cloud hosted by Microsoft®. Core shards can also be provisioned at private data centers or on other cloud networks, provided the data centers hosting the core shards have sufficient computing and networking hardware.

With reference now to FIG. 1, an example of a 5G data and telephone network 100 (i.e., a cellular communication system) built on a cloud-based environment is shown, in accordance with various embodiments. Cellular communication system 100 is implemented on cloud-based infrastructure to facilitate dynamic network adaptation. Cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external MVNOs, or converged operators.

In the example of FIG. 1, each RU 115 communicates with UE 141, 142, 143 operating within a geographic area using one or more antennas 114 capable of transmitting and receiving messages within an assigned spectrum 116 of electromagnetic bandwidth. In various embodiments, guest networks 102, 103, 104 interact with a provisioning plane 105 to obtain desired spectrum across one or more of the RUs 115 operated by the host 101. Provisioning plane 105 allows guest network operators to obtain or change their assigned bandwidths on different RUs 115 on an on-demand and dynamic basis.

The Open RAN (O-RAN) standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU, and CU functions are described in more detail in the Open RAN standards, as updated from time to time, and may be modified as desired to implement the various functions and features described herein. In the example of FIG. 1, host network 101 maintains one or more DUs and CUs (i.e., network functions) as part of its own network. The DU communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the Amazon® Web Service (AWS) platform offered by Amazon Inc., although other embodiments could use other cloud platforms or any type of conventional physical computing hardware 161, as desired. For example, 5G data and telephone network 100 could also run on ServerSpace, Microsoft Azure, Google Cloud Platform, IBM Cloud Services, Kamatera, VMware, or any other suitable cloud service. Embodiments of the present disclosure can use hardware of multiple cloud providers and other data centers to route time sensitive communications. Network core locations can be provisioned and decommissioned rapidly in response to changing needs of 5G data and telephone network 100.

As illustrated in the example of FIG. 1, 5G data and telephone network 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources. Instances of virtual DUs and virtual CUs may be associated with user accounts and other virtualized systems that create or access executables.

Guest networks 102, 103, 104 operated by guest operators can manage their own networks using allocated portions of spectrum 116 handled by one or more of the RUs 115 associated with the host network 101. The guest networks 102, 103, 104 communicate with one or more UEs 141-143 using allocated bandwidth 117, 118, 119 on the host's RU 115. Guest networks 102, 103, 104 may include one or more virtual DUs and CUs, as well as other network services 107, 108, 109 variously associated with user accounts and group permissions, as desired. Generally, one or more guest operators will instantiate its own 5G virtualized network functions (e.g., CMS, vCUs, vDUs, etc.) using cloud-based resources, as noted above. However, various embodiments may instantiate network services outside of cloud-based environments to route time-sensitive communications.

Each RU 115 is typically associated with a different wireless cell that provides wireless data communications to user devices 141-143. RUs 115 may be implemented with radios, filters, amplifiers, and other telecommunications hardware to transmit digital data streams via one or more antennas 114. Generally, RU hardware includes one or more processors, non-transitory data storage (e.g., a hard drive or solid-state memory), and appropriate interfaces to perform the various functions described herein. RUs are physically located on-site with the transmitter/antenna 114, as appropriate. Cloud-based data and telephone networks can make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of RUs 115 that can each be individually configured to provide highly configurable geographic coverage for a host or guest network, if desired. The physical RUs communicate with virtualized network nodes including DUs and CUs, which can be commissioned at new data centers to create routes for data or telephone communications that are shorter or faster than existing routes.

Figure 2:
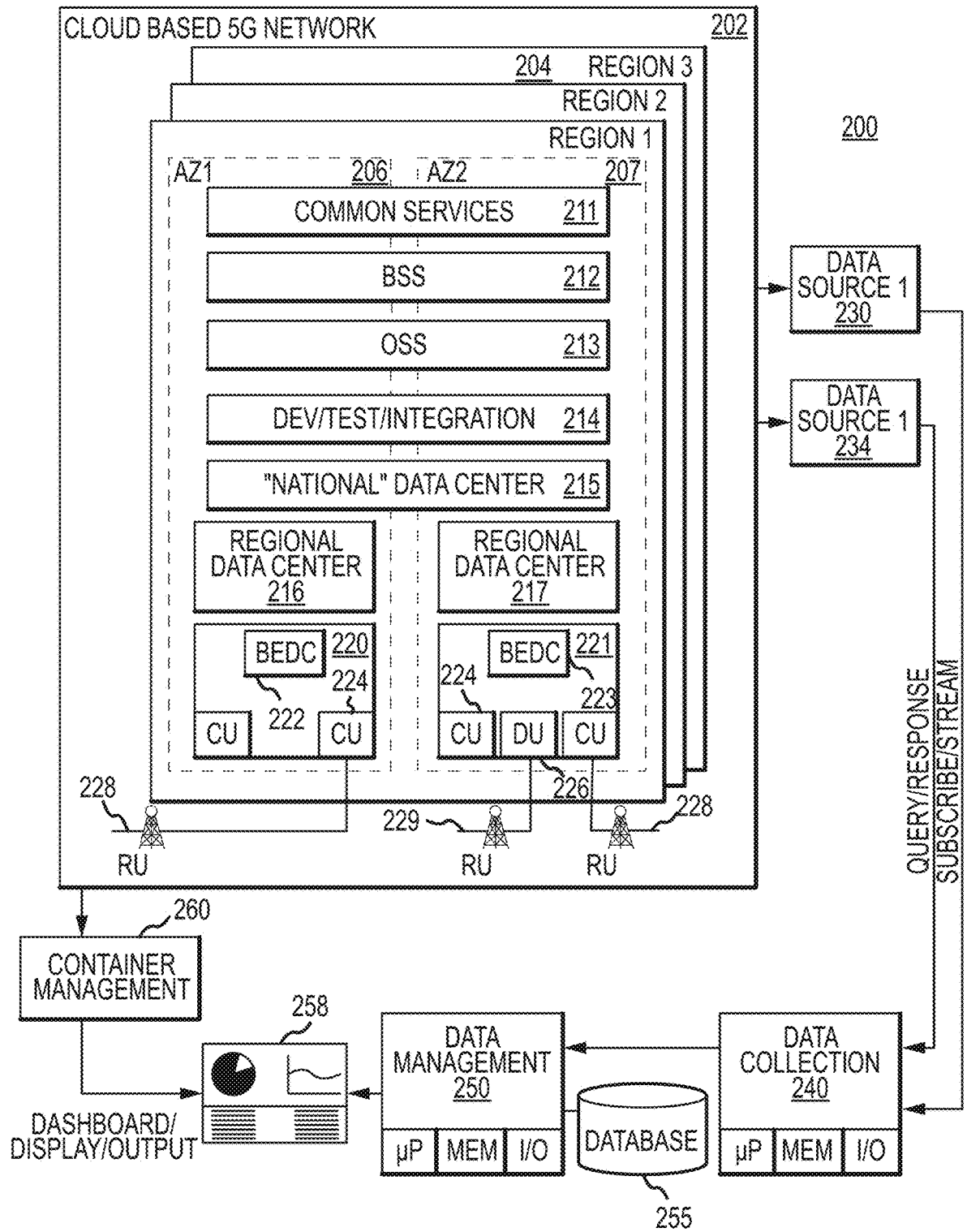
FIG. 2 illustrates an example of cloud infrastructure supporting a 5G data and telephone network, in accordance with various embodiments.

With reference to FIG. 2, a 5G wireless network 202 is implemented using cloud-based computing resources. In the example of FIG. 2, 5G wireless network 202 encompasses data processing services supporting multiple regions 204, each having one or more availability zones (AZs) 206, 207 that each act as a separate data center with its own redundant power, network connectivity, and other resources, as desired. In some implementations, the various AZs operating within the same region will provide redundancy in the event a neighboring AZ fails or is overloaded. New data centers can by dynamically added to the network to create routes for core services of data and telephone network 100 of (FIG. 1).

The example of FIG. 2 illustrates three regions, with region 204 having two AZs 206, 207, although other embodiments could include any number of regions and AZs providing any number of services and resources. The regions and availability zones are often described herein with reference to geographic locations, but in practice the regions and availability zones could be equivalently organized based upon customer density, user density, expected network demand, availability of electric power or bandwidth, or any other factors. As noted above, it will still be necessary to deploy radio units (RUs) within broadcast range of end users. But by implementing the other functions of the network using virtualized hardware operating within a cloud-type architecture, geographic restrictions on 5G wireless network 202 can be reduced. This can provide substantial efficiencies in deployment and expansion of 5G wireless network 202, while also allowing for more efficient use of computing resources, data storage, and electric power.

In example of FIG. 2, a network operator maintains ownership of one or more RUs 228 associated with a wireless network cell. Each RU 228, 229 communicates with UE operating within a geographic area using one or more antennas. In the example illustrated in FIG. 2, common services (e.g., billing, guest network allocation, etc.) can be performed in a shared service 211 across the available AZs 206, 207. Typically, these shared services will be implemented within a common virtual private cloud (VPC) operating within the cloud environment. Similarly, shared VPC systems can support business support system (BSS) 212, operational support services (OSS) 213, development/test/integration features 214, and/or the like across the entire region. A region wide data center (identified as a "national" data center 215 in FIG. 2) could be implemented in a shared VPC across AZs 206, 207, if desired, with subordinate data centers (e.g., "regional" data centers 216, 217) being separated into different VPCs for each of the AZs 206, 207. Additional levels of data centers could be provided, if desired, or the different data center functions could be differently organized in any number of equivalent embodiments.

These national data centers 215 are limited by their geographic locations. A cloud-based 5G network implementing O-RAN specifications will typically hosts its 5G core services out of a national data center 215. Embodiments of the present disclosure can create core shards running on national data centers hosted in distinct cloud environments (e.g., an AWS-based VPC can create a core shard in a national data center 215 of an Azure-based VPC). Core shards can be located closer to the BEDCs 220 and 221 than the traditional cores hosted in only a few locations across the region (e.g., for across the U.S. in AWS-based systems). Core shards may be closer to the RU 228, and thus closer to the user equipment communicating with RU 228.

The national data centers 215 are typically equipped to host resource-intensive services such as 5G core services. In the AWS example, the national data center 215 is available in four regions in the United States (Oregon, Ohio, California, and Virginia). In an Azure-based example, national data centers 215 are available in Arizona, Washington, California, Wyoming, Texas, Illinois, Georgia, Virginia, and Iowa. While U.S. states are used as example locations, cloud systems in any nation or region could be equivalently used to implement the core sharing and scaling techniques described herein.

In the example of FIG. 2, each AZ 206, 207 includes one or more breakout edge data centers (BEDCs) each supporting a local zone (LZ) with one or more RUs. The BEDCs are ideally organized for very low latency to provide best possible throughput and low latency to the various user equipment operating within the local zone. BEDCs 220, 221 will typically implement one or more CUs in accordance with the O-RAN specifications. BEDCs may also implement user plane functions that handle user data sessions for gaming, streaming, and other network services, as desired. Again, any number of BEDCs and other data centers may be implemented using any number of different or shared VPCs in the cloud environment.

As noted above, each of the various network components shown in FIG. 2 is typically implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, or the like.

The various components of 5G wireless network 202 can be implemented using virtual private clouds (VPC) or other virtual hardware components. Each of these VPCs will typically produce data during operation that indicates status, performance, capacity, or any number of other parameters. It is generally desired to monitor the status of 5G wireless network 202. One way to track network status is to process the large amount of data produced by the various modules and components to generate dashboards or other reports that can be viewed by an operator. Operating data can also be used to adjust the configuration or operation of the network. For example, core services can be sharded into supporting locations by provisioning core service functions on a secondary cloud or in data centers outside of the network operator's primary cloud.

In various embodiments that make use of a data pipeline, one or more data sources 230, 234 can be provided to obtain raw data from one or more of the components of 5G wireless network 202. Data sources 230, 234 may receive data as part of a data stream, if desired. Other data sources 230, 234 may simply receive and maintain log data or the like from one or more associated components, as appropriate. Any number of streaming or query-based data sources 230, 234 may be deployed within system 200 as desired.

In the example shown in FIG. 2, data source 230 may be configured in accordance with the KAFKA software tool available from the Apache Software Foundation. The software may be installed to execute on any sort of hardware, including a conventional computer server with a processor, memory, and input/output interfaces to the appropriate components of 5G wireless network 202. Equivalently, data source 230 may be implemented using a virtual private cloud or virtual server system as part of a cloud provider, as desired.

The streaming data source 230 will typically be configured to receive real-time data (or near real time data, accounting for some delays inherent in data processing, communications, and the like) from one or more components of 5G wireless network 202. Streaming data may be particularly useful for network components that generate substantial amounts of real-time data (e.g., performance measurements, etc.). Data source 230 will be configured to receive the data stream from the monitored component, typically as a consumer process executed by data source 230. Other embodiments may use other tools, and/or may be configured in any other manner.

If desired, multiple components of 5G wireless network 202 could supply streaming data to a common data source 230. DU and CU modules of 5G wireless network 202, in particular, provide substantial amounts of real-time data that can be very efficiently pipelined through a combined streaming data source 230, as appropriate.

In the example of FIG. 2, data source 234 is shown as a query-based source that collects data from one or more components of 5G wireless network 202. Generally speaking, data handled by query-based sources tends to be less reliant upon real-time delivery for status updates, or the like. Log data, fault metrics, performance metrics, and other types of time-series data may be particularly well-suited for query-type collection.

In one embodiment, query-based data source 234 is implemented for a pull-based data collection model using HTTP-type messaging. Software is configured to run on a computer server (implemented with conventional hardware and/or cloud-based resources, as desired) that queries the monitored components according to any desired time schedule to receive data. The data received in response to the queries may be locally cached in any sort of non-transitory memory (e.g., solid state memory, magnetic or optical memory, cloud-based sources, and/or the like) for subsequent retrieval and processing, as desired. Query-based data source 234 may be particularly useful in tracking data produced by the various DUs, MTAs, and other components of the network that produce substantial amounts of log data. Typically, each component is configured to write its output/log data to the data source 234, as desired.

Although FIG. 2 illustrates one streaming data source 230 and one query-based data source 234, in practice, any number of different sources could be used to monitor any number of different components of 5G wireless network 202. Some components may provide streaming data and query-based data to multiple data sources, if desired.

A data collection system 240 suitably communicates with one or more data sources 230, 234 to obtain streaming or query-based data. In various embodiments, data collection system 240 subscribes to one or more data feeds or other streaming services associated with data sources 230, 234. Data collection system 240 may also be configured to place queries on query-based data sources 234, as desired. Data collection system 240 typically receives the requested and/or subscribed data, formats and/or filters the received data as appropriate, and forwards the collected data to a data management system 250 for storage, reporting, and/or any other further processing as desired. In various embodiments, the data collection system 240 receives data in JSON or similar format, appends source and/or service location information as tags, or the like, and pushes the tagged data to the data management system 250 (using, e.g., HTTP structures, or the like). Generally, the data collection system will be configurable to specify batch sizes, delivery times, and/or other parameters for obtaining query-based data and/or for pushing collected data to the data management system 250. Some embodiments may also filter the received data as desired to remove unwanted or unnecessary data that would otherwise consume excess storage in data management system 250. Other embodiments may perform additional monitoring, as needed.

Data management system 250 is any data processing system capable of receiving the data from data collection system 240 and presenting the collected data for further use. In various embodiments, data management system 250 is a computer server implemented with conventional or virtual cloud-based hardware executing software for managing collected data. In various embodiments, data management system 250 stores received data in a database 255 for later retrieval, as desired. Data management system 250 may also provide reports to human and/or automated reviewers. Output 258 can be displayed visually in dashboard form, for example. Output 258 can be in a machine-readable form such as a tagged data store, a JSON file, or other structured or unstructured data formats. Output 258 can be used to assess routing performance for calls and other time sensitive communications. Output 258 can indicate that existing routes for a cross country call are slow or long compared to potential routes that could be created by sharding core network services into new data centers.

The example illustrated in FIG. 2 shows data sources 230, 234 as obtaining aggregated data from components of 5G wireless network 202. This points out the relationships between the sources of data, data collection system 240, and data management system 250. In a practical implementation, however, data collection system 240 may be equivalently configured to subscribe to live data streams or to directly poll components of 5G wireless network 202, without the need for separate data aggregation systems 230, 234, as desired.

In another equivalent embodiment, the functionality of data sources 230, 234 is designed into the components of the 5G wireless network 202 themselves, thereby obviating the need for separate aggregation. One or more components of 5G wireless network 202 may be configured to supply a data stream directly to data collection system 240, for example. Similarly, data collection system 240 could posit queries directly to components of 5G wireless network 202, if desired, without the need for intervening processing modules. Processed data is provided for delivery to the data management system 250 described above. In various embodiments, output feature 258 provides data to the data management system 250 using HTTP structures (e.g., HTTP "PUT" features), JSON, unstructured data, or the like. Other embodiments could implement the various functions and components described herein in any number of equivalent arrangements.

In operation, then, a data management system 250 obtains streaming or query-based data from one or more components of a 5G wireless network operating within a cloud-based computing environment. The data is obtained directly from the component, or via intervening data source systems 230, 234 that aggregate data from multiple data sources within 5G wireless network 202. Collected data is tagged and filtered as desired, and the resulting data is delivered to a data management system for storage, reporting, and/or other actions as appropriate. Other embodiments may include other processing modules in addition to those illustrated, and/or may provide the various features and functions described herein using different (but equivalent) arrangements of processing modules and features, as desired.

Figure 3A:
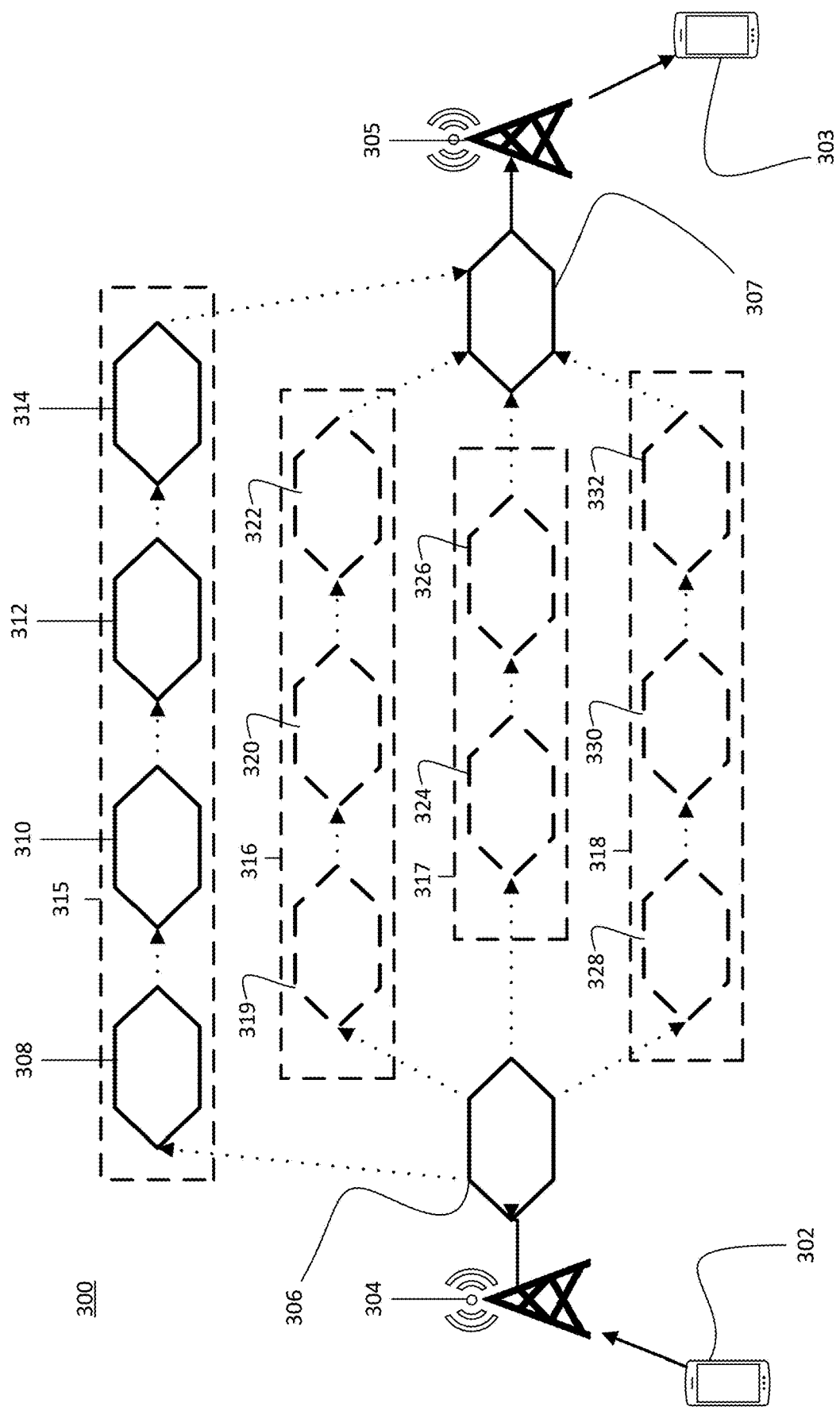
FIG. 3A illustrates an example system for identifying potential core shards to implement core services of a 5G data and telephone network, in accordance with various embodiments.

Referring now to FIG. 3A, an example system 300 is shown for routing communications across sharded core services. In the example of FIG. 3A, system 300 includes UE 302 in cellular communication with RU 304. RU 304 communicates with edge services 306, which are hosted at an edge facility such as BEDC 221 (of FIG. 2). Edge services may host virtualized DU and CU functions in support of RU 304. Similarly, UE 303 communicates with RU 305 and edge services 307. For UE 302 to call UE 303 in a different region (e.g., from UE 302 in California to UE 303 in Georgia), core services route the cross-region communication.

In various embodiments, system 300 maps potential routes through core locations. Mapping may be performed at edge services 306, 307 or at any point along a route to identify a shorter route for communications from UE 302 to UE 303. Regional instances of network core services 308, 310, 312, and 314 are each permanently hosted at a different national data center 215 (of FIG. 2) throughout a service territory. The default, permanent, or currently provisioned core 315 may comprise the regional instances 308-314. Default core 315 may be provisioned on the same cloud-based system as other network functions supporting data and telephone network 100 (of FIG. 1). For example, an AWS-based ORAN network could currently host core services in Oregon, Ohio, California, and Virginia.

System 300 in the example of FIG. 3A may have access to national data centers 215 (of FIG. 2) logically located outside of its host VPC environment and capable of supporting core functions of 5G data and telephone network 100 (of FIG. 1). Such national data centers will typically be within the service region of 5G data and telephone network 100, and could enable shorter routes between RU 304 and RU 305 in response to core services being provisioned at these locations. Potential core shards 316, 317, and 318 represent potential routes for network core services that could be temporarily provisioned in potential instances of core services 319-332 hosted at different national data centers 215.

In various embodiments, potential core shards 316, 317, and 318 can each be hosted and operated by different entities and can support logically separated cloud environments. Dedicated resources of different entities can support fast transportation of large quantities of data using core resources such as, for example, a core communication channel having high bandwidth or dedicated fiber, dedicated routing hardware, or other core network infrastructure. For example, potential instances 319, 320, and 322 could be hosted at data centers that support Azure cloud computing resources. Potential instances 324 and 326 of core services could be hosted on computing resources that support the Google Cloud Platform. Potential instances of core services 328, 330, and 332 could be privately operated data centers supporting a private cloud operated by host operator 101 (of FIG. 1) to support 5G data and telephone network 100.

Since locations for national data centers 215 are typically fixed due to the physical location of underlying infrastructure, system 300 may maintain a route table comprising a list of routes across potential core shards. The routes can include estimated transit times based on past transit times for similar communication types. The routes tables can include provisioning time required to spin up core instances that make up stops along the core shards. The route tables can include an indicator whether the core shard is currently provisioned or is dormant. In some embodiments, potential core shards 316-318 may be permanently provisioned and available as alternative core routes.

Some embodiments of edge services 306 can selectively route core functions across a desired core shard based on various criteria. Example criteria can include shortest distance to an instance of the core shard, closest proximity of the core shard to an endpoint, lowest computing-resource usage, fastest delivery time, or closest data center location relative to the endpoint RU. Core shards may also be selected for routing in response to being currently provisioned. Core shards can be selected based on a sum of the distances, transit times, or hops from edge services 306 to the first instance of the shard and from the last instance of the shard to edge services 307. Mapping techniques can be applied to select a core shard for routing a core service. Each potential core shard can be stored in a route table along with metrics and other metadata suitable for applying selection criteria.

Various embodiments can select core shards for routing in response to the guest operator 102-104 (of FIG. 1) or host operator 101 (of FIG. 1) that carries the service subscription for UE 302 or 303. The availability of various core shards can be limited to host or guest operators with a desire for performance and scalability. The selected core shard can be used to perform core functions or other network functions.

Various embodiments implement core services that do not require routing between UE in different regions across a multi-instance core shard. For example, local calling can bounce off a core service for billing, authentication, or other core services and back along the same route to the same RU 304 for a local call. For such embodiments, a limited core shard comprising a single instance can be instantiated near the RU 305 to facilitate quick core service provisions. For example, a local call in Phoenix, AZ might have to route to Oregon to hit the nearest traditional core services data center. Instead, a core shard can be instantiated with a single instance in an Arizona data center to provide core services supporting the local call without routing to the traditional core location in Oregon.

In various embodiments, core shards can be dynamically provisioned and deprovisioned in response to load or need. Core shards can be provisioned and deprovisioned on a time-based schedule. Management plane resources may be permanently running at data centers that host instances 319-322. Management plane may instantiate core services at each data center along a core shard dynamically. Management plane may maintain a minimal quota of core services at each data center, and may instantiate additional instances in response to increased load or demand for core services across a supported shard. An instance may be part of more than one core shard.

Figure 3B:
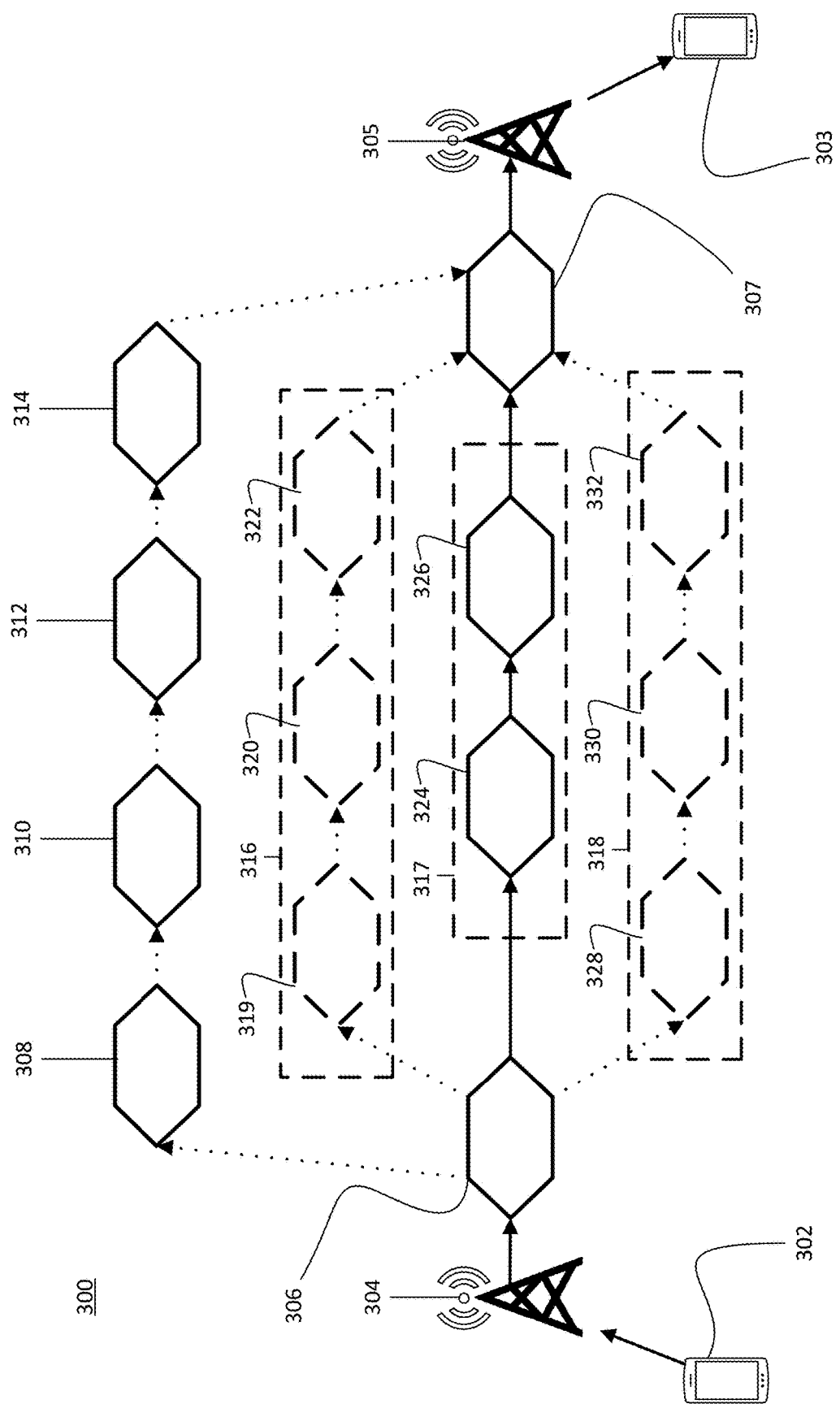
FIG. 3B illustrates an example system for instantiating a selected core shard to implement core services of a 5G data and telephone network, in accordance with various embodiments.

Referring now to FIG. 3B, system 300 is shown with core shard 317 selected for routing a core service. Instance 324 and instance 326 of core services are provisioned at underlying data centers associated with the computing resources that support core shard 317. Instances can support all core services of underlying 5G data and telephone network 100, or instances can support selected core services. Some examples support telephone calls and messages routed across instances that make up core shards, while other examples can support any desired selection of core services. Dedicated communication resources can be used between instance 324 and instance 326. Some embodiments may include dedicated backhaul communication resources between the data center supporting edge services 306 and the national data center supporting instance 324. Some embodiments may similarly include dedicated communication resources between the data center supporting edge services 307 and the national data center supporting instance 326. A message or telephone call from UE 302 to UE 303 can thus be routed outside of the VPC that the host operator typically uses to support 5G data and telephone network 100.

Figure 4:
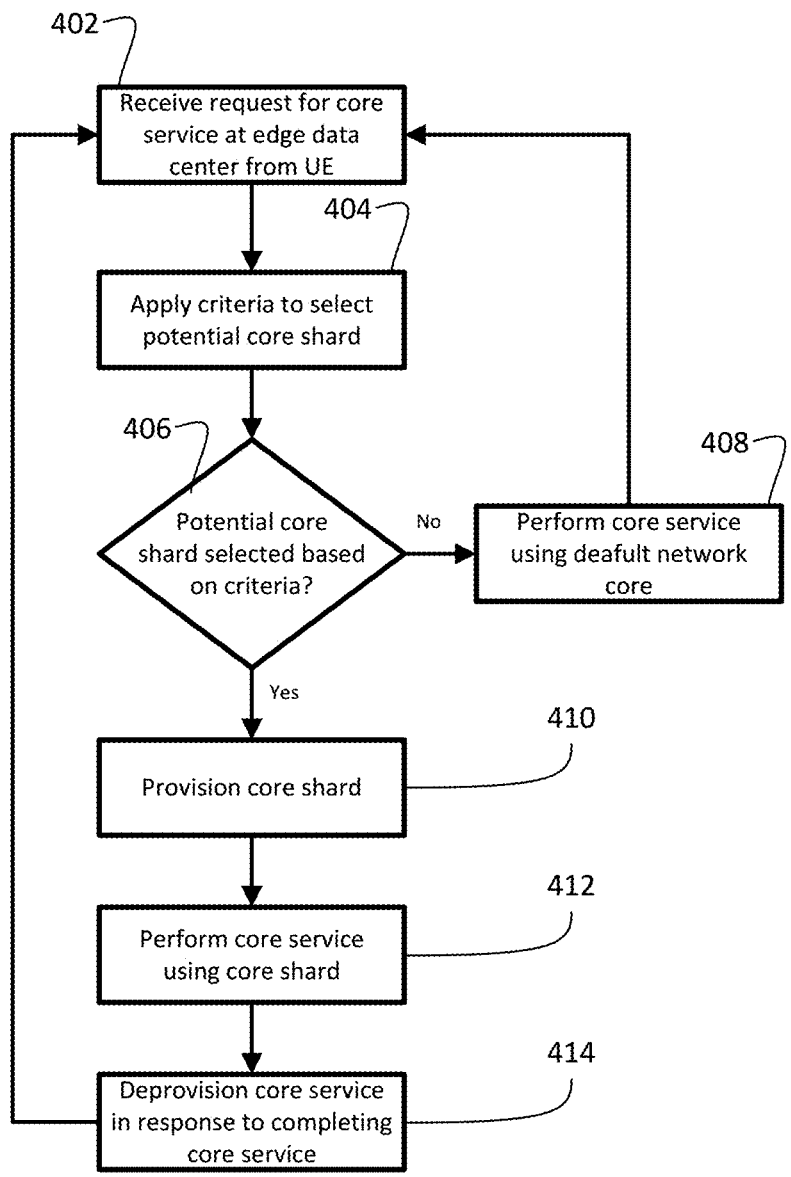
FIG. 4 illustrates an example process for using core shards to implement core services of a 5G data and telephone network, in accordance with various embodiments.

Referring now to FIG. 4, an example process 400 is shown for performing core services of 5G data and telephone network 100 (of FIG. 1) using core shards 316-318 (of FIG. 3A), in accordance with various embodiments. The example of FIG. 4 receives a request at edge data center 222 (of FIG. 2) from a UE for a core service (Block 402). The request could be for a communication spanning a large distance to reach its endpoint. For example, a cross country telephone call from California to New York can use core services to route the telephone call. The core service can also include application of access controls to resources, user authentication for services, message routing, billing for services, handoffs between cell sites, or connections from the network out to the Internet or other area networks.

In various embodiments, system 300 can apply criteria to potential core shards to select a core shard (Block 404). The criteria for comparison of potential core shards with one another can include, for example, shortest distance, closest proximity, lowest computing-resource usage, fastest delivery time, lowest bandwidth consumption, or proximity of data center location relative to the endpoint RU. Core shards can also be selected using criteria that are non-comparative with other core shards. For example, core shards can be selected based on having a threshold distance, resource cost, bandwidth consumption, or other suitable criteria. System 300 may assess whether a potential core shard 316-318 was selected based on the application of the criteria (Block 406).

Core shards can be provisioned or deprovisioned in response to criteria at least partially unrelated to the core shards themselves. For example, network load can trigger provisioning of a core shard. In another example, a high volume of cross-country communication traffic from one region to another region can trigger provisioning of a core shard to service the communications between the two regions.

Various embodiments may perform the requested core service using default core 315 (of FIG. 3A) (Block 408). Default core 315 may be the core permanently provisioned to support 5G data and telephone network 100. In response to selecting a potential core shard 317 based on the criteria, system 300 provisions the selected core shard 317 (Block 410). Core shard 317 may be provisioned by instantiating instances 324 and 326.

Various embodiments of system 300 may perform the requested core service using the provisioned core shard (Block 412). Instances 324 and 326 can run at core data centers of other cloud networks outside of the cloud network used by host operator 101 (of FIG. 1) to host network services. In that regard, backbone infrastructure may connect instances of a single core shard to one another, but backbone infrastructure may not connect an instance of a first core shard to an instance of a different core shard. A core shard can thus use powerful backbone resources outside of its native cloud-based network to perform tasks within the shard. Core shards allow data and telephone networks to perform core services faster or in closer proximity to the end point (e.g., edge server 222 running edge services 306, or UE 302).

In various embodiments, system 400 deprovisions core shard 317 in response to completing the requested core service (Block 414). Some embodiments may permanently provision core shards, may provision core shards for a predetermined duration, or may provision core shards for a predetermined number of tasks. A management plane is typically present in the data centers that support core shards, which are typically outside the native cloud system of host operator 101. The management plane can allocate resources in the data centers supporting core shards for the desired duration of the core shards operation. Deprovisioned core shards can be reprovisioned in response to provisioning criteria being met.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for routing on a data and telephone network, the method comprising:
   receiving a communication from a first user equipment (UE) at a first edge data center of a first cloud network, wherein the communication is directed to a second UE;
   selecting a potential core shard to route the communication from a plurality of potential core shards, wherein the potential core shard comprises a first instance at a first data center of a second cloud network and a second instance at a second data center of the second cloud network, wherein a core communication channel connects the first data center to the second data center;
   provisioning the first instance at the first data center and the second instance at the second data center in response to selecting the potential core shard;
   routing the communication from an edge service to the first instance over a first communication channel;
   routing the communication from the first instance to the second instance over the core communication channel; and
   routing the communication from the second instance to the second UE over a third communication channel.

2. The method of claim 1, wherein the plurality of potential core shards includes a third core shard of a third cloud network.

3. The method of claim 1, wherein the potential core shard is selected in response to having a fastest transit time of the plurality of potential core shards.

4. The method of claim 1, wherein the potential core shard is selected in response to having a shortest distance of the plurality of potential core shards.

5. The method of claim 1, further comprising decommissioning the first instance at the first data center and the second instance at the second data center in response to completing the communication.

6. The method of claim 1, wherein the first cloud network is hosted by a first cloud provider and the second cloud network is hosted by a second cloud provider.

7. The method of claim 1, wherein the first data center and the second data center are hosted by a network operator outside of the first cloud network.

8. A method for routing on a data and telephone network, the method comprising:
   receiving a request from a first user equipment (UE) at a first edge data center of a first cloud network to access a core service of the data and telephone network;
   selecting a core shard from a plurality of potential core shards to perform the core service, wherein the core shard comprises a first instance at a first core data center outside of the first cloud network;
   provisioning the first instance at the first core data center in response to selecting the core shard; and
   routing the request from the first UE to an edge service over a first communication channel; and
   routing the request from the edge service to the first instance over a second communication channel.

9. The method of claim 8, further comprising:
   performing the core service at the first instance; and
   decommissioning the first instance in response to completing the core service.

10. The method of claim 9, wherein the core service includes authenticating the first UE, handing the first UE off to a new radio unit, or billing.

11. The method of claim 9, wherein the core shard is selected from the plurality of potential core shards in response to the first instance having a closest proximity to the edge service.

12. The method of claim 8, wherein the core shard is selected from the plurality of potential core shards in response to having a fastest estimated completion time for the core service.

13. The method of claim 8, wherein the first cloud network is hosted by a first cloud provider and the first instance is hosted by a second cloud provider.

14. The method of claim 8, wherein the first core data center comprises a private data center hosted by an operator of the data and telephone network outside of the first cloud network.

15. The method of claim 8, further comprising:
provisioning a second instance of the core shard at a second data center in response to selecting the core shard, wherein the request comprises a communication directed to a second UE;
routing the communication from the first instance to the second instance over a core communication channel; and
routing the communication from the second instance to the second UE over a third communication channel.

16. The method of claim 15, wherein the plurality of potential core shards includes a plurality of instances hosted on a plurality of cloud networks.

17. A cloud-based data and telephone network comprising a processor in communication with a non-transitory memory configured to store instructions that, when executed by the processor, cause the cloud-based data and telephone network to perform operations, the operations comprising:
receiving a communication from a first user equipment (UE) at a first edge data center of a first cloud network, wherein the communication is directed to a second UE;
selecting a potential core shard to route the communication from a plurality of potential core shards, wherein the potential core shard comprises a first instance at a first data center of a second cloud network and a second instance at a second data center of the second cloud network, wherein a core communication channel connects the first data center to the second data center;
provisioning the first instance at the first data center and the second instance at the second data center in response to selecting the potential core shard;
routing the communication from an edge service to the first instance over a first communication channel;
routing the communication from the first instance to the second instance over the core communication channel; and
routing the communication from the second instance to the second UE over a third communication channel.

18. The cloud-based data and telephone network of claim 17, wherein the first cloud network is hosted by a first cloud provider and the second cloud network is hosted by a second cloud provider.

19. The cloud-based data and telephone network of claim 17, wherein the potential core shard is selected in response to having a fastest transit time of the plurality of potential core shards.

20. The cloud-based data and telephone network of claim 17, wherein the operations further comprise decommissioning the first instance at the first data center and the second instance at the second data center in response to completing the communication.

* * * * *